(12) United States Patent
Juang

(10) Patent No.: US 6,715,125 B1
(45) Date of Patent: Mar. 30, 2004

(54) SOURCE CODING AND TRANSMISSION WITH TIME DIVERSITY

(75) Inventor: Biing-Hwang Juang, Warren, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/420,277

(22) Filed: Oct. 18, 1999

(51) Int. Cl.$^7$ .............................................. G11B 27/00
(52) U.S. Cl. ..................................................... 714/814
(58) Field of Search ................................ 714/746, 752, 714/757, 799, 814, 758, 704, 708

(56) References Cited

U.S. PATENT DOCUMENTS

| | | | |
|---|---|---|---|
| 5,671,156 A | * 9/1997 | Weerackody et al. | 714/52 |
| 6,023,783 A | * 2/2000 | Divsalar et al. | 714/792 |
| 6,456,964 B2 | * 9/2002 | Manjunath et al. | 704/205 |
| 2002/0099548 A1 | * 7/2002 | Manjunath et al. | 704/266 |

* cited by examiner

*Primary Examiner*—Christine T. Tu
(74) *Attorney, Agent, or Firm*—Ryan, Mason & Lewis, LLP

(57) ABSTRACT

A repetitive transmission technique with time diversity which provides improved signal-to-noise ratio (SNR) in the presence of packet loss. Time shifts are introduced between N versions of a particular block of information to be transmitted, and the time-shifted versions are encoded in a set of N encoders and transmitted as N packets. The time shift introduced between a given pair of the N versions corresponds to approximately 1/N of the time duration of a particular one of the versions. The SNR of a composite reconstructed signal generated from the N packets with the introduced time shift in a receiver of the system is approximately the same as would be obtained using a set of N independent encoders to generate the plurality of packets without the introduced time shifts. The gain in the SNR of the composite reconstructed signal attributable to the introduction of the time shifts is $10 \log_{10} N'$, where $N'=1, \ldots N$ is the total number of the N packets actually received at the system receiver. A further improvement in SNR performance may be obtained by introducing quantization error compensation, in which quantization error from the encoding of a given one of the versions is successively combined with subsequent versions prior to encoding of those versions.

25 Claims, 2 Drawing Sheets

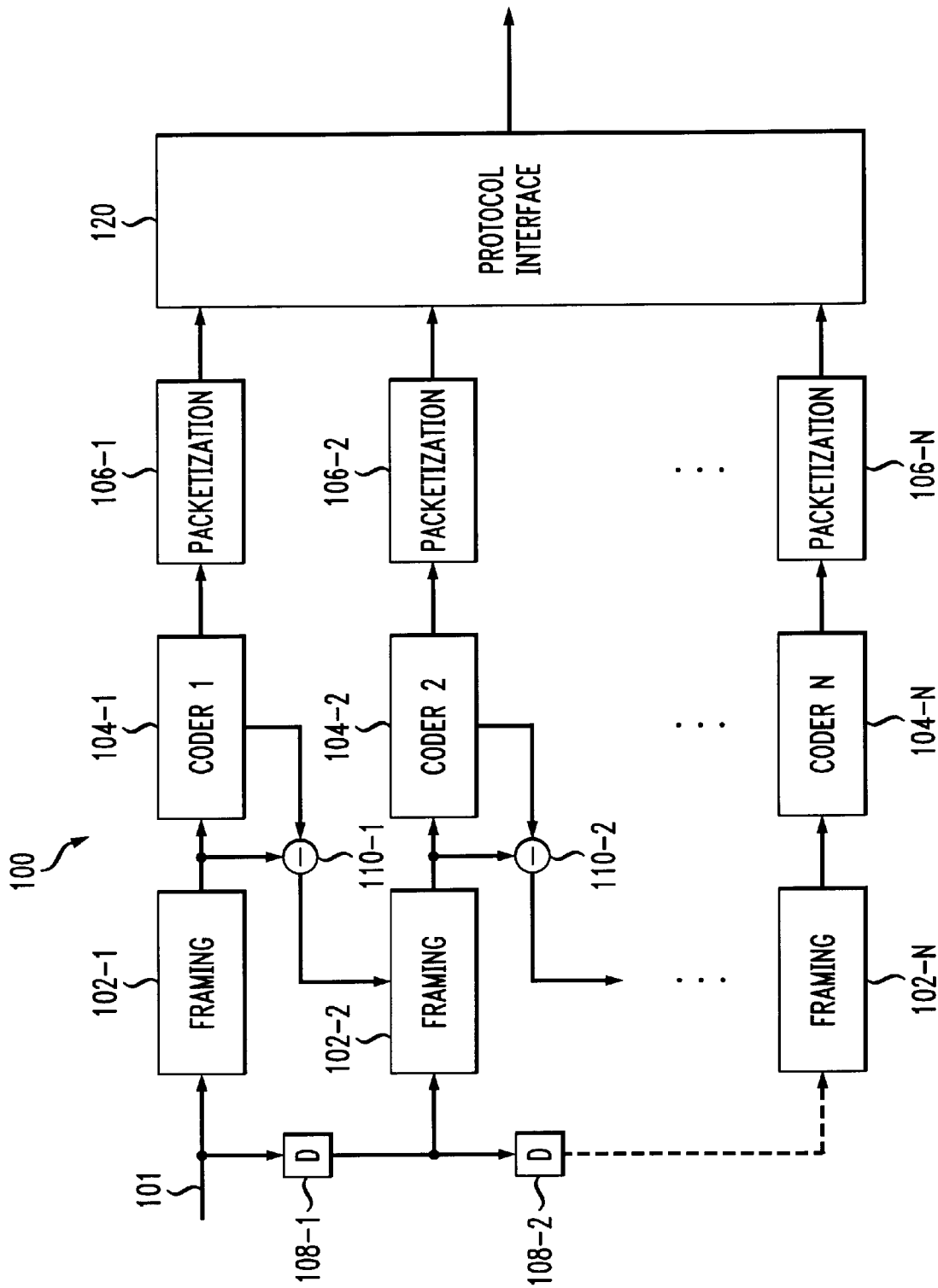

SOURCE CODING AND TRANSMISSION WITH TIME DIVERSITY

FIELD OF THE INVENTION

The present invention relates generally to communication systems, and more particularly to time diversity techniques for use in improving signal-to-noise ratio (SNR) or other performance measures in a communication system.

BACKGROUND OF THE INVENTION

In packet telephony or broadcasting applications, such as voice transmission over asynchronous transfer mode (ATM) or Internet protocol (IP) networks, channel impairments often result in conditions in which transmitted information packets are dropped due to congestion or interference. A well-known conventional technique for addressing this problem involves repetitive transmission. In repetitive transmission, the same block of signal information is quantized, encoded and transmitted several times, e.g., N times as N separate packets containing the same information. As an example, consider a signal $$[S(i)] = S(i)\Big|_{i=1}^{L}.$$

The quantized and reconstructed version of this signal is given by $$[\overline{S}(i)] = \overline{S}(i)\Big|_{i=1}^{L}.$$

It can be shown that $$S(i) = \overline{S}(i) - n(i) \text{ or } \overline{S}(i) = S(i) + n(i)$$

where n(i) is the quantization noise, assumed for this example to be independent, identically distributed (iid), and independent of $\overline{S}$. The signal-to-noise ratio (SNR) for this repetitive transmission technique is $$\frac{\langle S^2 \rangle}{\langle n^2 \rangle}$$

regardless of the number of repetitions. When packet loss occurs, the signal can still be recovered as long as any one of the N packets is received by the receiver. The signal blocks are processed sequentially without overlap.

The above-described repetitive transmission technique does not attempt to improve SNR performance, but is instead directed only to alleviating the problem of packet loss. The technique is inefficient in terms of coding gain given that it consumes N times the bits otherwise required to transmit the same information. A need thus exists for signal transmission techniques which can provide improved SNR performance, as well as robust signal reconstruction under adverse transmission conditions.

SUMMARY OF THE INVENTION

The invention provides improved repetitive transmission techniques which utilize time diversity to increase the signal-to-noise ratio (SNR) of a reconstructed composite signal in the presence of packet loss. In accordance with the invention, time shifts are introduced between N versions of a particular block of information to be transmitted, and the time-shifted multiple versions are encoded in a set of N encoders and transmitted as N packets. The time shift introduced between a given pair of the N versions corresponds to approximately 1/N of the time duration of a particular one of the versions. The SNR of a composite reconstructed signal generated from the N packets with the introduced time shift in a receiver of the system is approximately the same as would be obtained using a set of N independent encoders to generate the plurality of packets without the introduced time shifts. The gain in the SNR of the composite reconstructed signal attributable to the introduction of the time shifts is $10 \log_{10} N'$, where $N'=1, \ldots N$ is the total number of the N packets actually received at the system receiver.

In accordance with another aspect of the invention, a further improvement in SNR performance may be obtained by introducing quantization error compensation, in which quantization error from the encoding of a given one of the versions is successively combined with subsequent versions prior to encoding of those versions. In this case, the gain in the SNR of the composite reconstructed signal attributable to the introduction of the time shift and the quantization error compensation is $$20 \log_{10} N - 10 \log_{10}[2(N-N')+1],$$

where, as noted above, $N'=1, \ldots N$ is the total number of the N packets actually received at the system receiver.

In accordance with other aspects of the invention, each of the N packets may be generated by a corresponding one of N independent encoders, such that their quantization noise components are independent; and the particular value of N may be made adaptive to network conditions such as packet loss rate, e.g., N may be made large if the packet loss rate is high.

Advantageously, the invention provides substantially improved SNR performance relative to conventional repetitive transmission, without significantly increasing transmission complexity. Although particularly well-suited for use in packet voice transmission applications, the invention can be applied to the transmission of any other type of digital information, including, e.g., data, audio, video and image information. In addition, the invention may be implemented in a wide variety of packet-based communication systems, such as, e.g., ATM or IP networks, Internet and satellite broadcasting systems, digital audio broadcasting systems, etc.

BRIEF DESCRIPTION OF THE DRAWINGS

FIG. 3 shows a portion of a communication system transmitter suitable for implementing the exemplary time diversity techniques of FIGS. 1 and 2.

DETAILED DESCRIPTION OF THE INVENTION

The invention in the illustrative embodiment to be described below provides source coding and transmission with time diversity in an exemplary communication system. It should be understood, however, that the time diversity techniques of the invention may be applied to the transmission of any type of information, e.g., audio, speech, video or image information, and any type of source coding device. In addition, the invention may be utilized in a wide variety of different types of communication applications, including communications over the Internet and other computer networks, and over cellular multimedia, satellite, wireless cable, wireless local loop, high-speed wireless access and other types of communication systems. The invention may be utilized with any desired type of communication channel or channels, such as, e.g., voice, data or other connections in an asynchronous transfer mode (ATM) network, an Internet protocol (IP) network or other type of packet-based network.

The present invention is directed to source coding and transmission techniques which provide coding gain in the absence of packet loss while also maintaining an improved SNR relative to conventional repetitive transmission when packet loss occurs. The invention will be illustrated by first considering a modification of the above-described conventional repetitive transmission technique to include N independent quantizers, such that $$S(i) = \bar{S}^{(1)}(i) - n^{(1)}(i)$$
$$= \bar{S}^{(2)}(i) - n^{(2)}(i)$$
$$\vdots$$
$$= \bar{S}^{(N)}(i) - n^{(N)}(i)$$

The quantization noise components $n^{(j)}(i)$, $j=1, 2 \ldots N$, are all assumed to be independent and identically distributed (iid) in this example. When all N packets are received, the receiver can add the corresponding individual reconstructed signals together, producing a composite reconstructed signal which has a higher SNR than the individual reconstructed signal which would result from receipt of any one of the N packets. More particularly, $$\bar{S}(i) = \bar{S}^{(1)}(i) + \bar{S}^{(2)}(i) \ldots + \bar{S}^{(N)}(i)$$
$$= N S(i) + n^{(1)}(i) + n^{(2)}(i) \ldots + n^{(N)}(i)$$

The SNR in this case is given by $$\frac{N^2 <S^2>}{N <n^2>} = N \frac{<S^2>}{<n^2>}$$

which represents a gain of $10 \log_{10} N$. For example, if N=2, there is a 3 dB gain in SNR. In general, the SNR improvement in the case of repetitive transmission with N independent quantizers is $10 \log_{10} N'$ where N' is the number of received packets for the same block of signal information.

Figure 1:
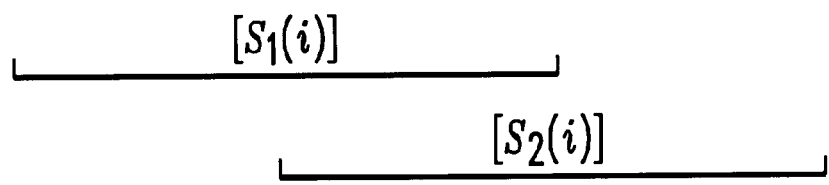
FIG. 1 illustrates the relationship between multiple versions of a block of information to be transmitted using an exemplary time diversity technique in accordance with the invention.

In accordance with the invention, it is possible to achieve the same SNR performance as the above-described case of repetitive transmission using N independent quantizers, without actually making the quantizers independent. Instead, time diversity is introduced by shifting a block of information by an amount corresponding to 1/N of the block size each time the block of information is quantized and transmitted. FIG. 1 illustrates the relationship between the resulting signal blocks $S_1(i)$ and $S_2(i)$ for a case in which N=2. It can be seen that the signal block $S_2(i)$ in this case is shifted in time relative to the signal block $S_1(i)$ by an amount of time corresponding to ½ the block size.

As previously noted, the time diversity technique illustrated in FIG. 1 provides the same SNR improvement as the above-described case with N independent quantizers. The advantage of the FIG. 1 arrangement is that instead of designing N independent quantizers, each of which may require a different structure or quantization table, a model-based coding technique, such as, e.g., a linear prediction analysis by synthesis coder with a vector quantizer, can produce uncorrelated coding noise, due to the previously-described time shift between signal blocks. Again, the SNR gain is $10 \log_{10} N'$ where N' is the total number of overlapping signal blocks or packets actually received at the receiver.

Figure 2:
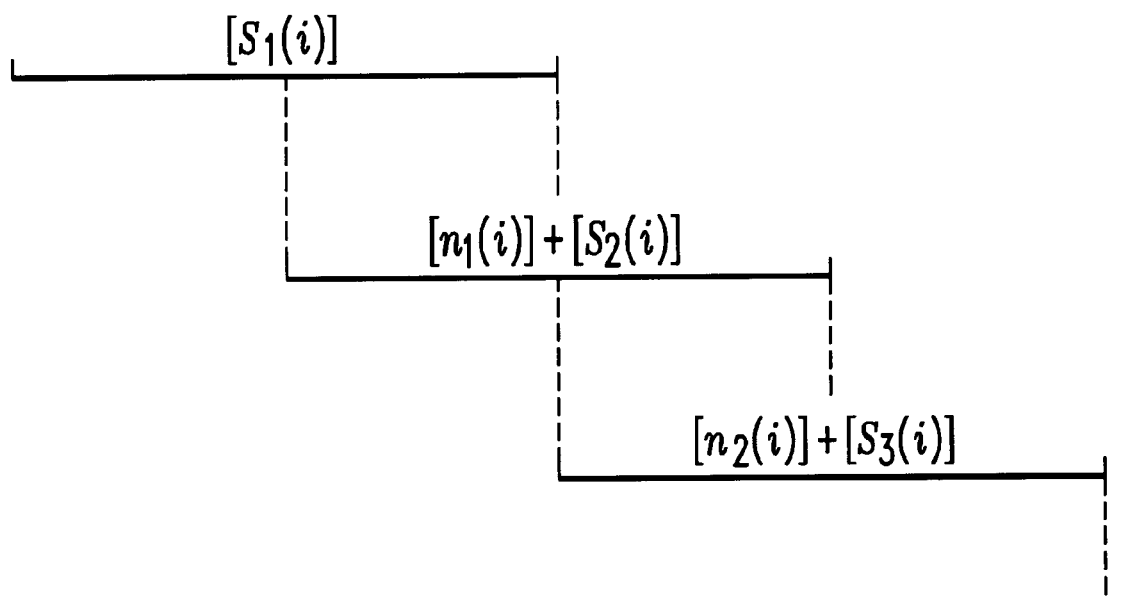
FIG. 2 shows the relationship between multiple versions of an information block in an exemplary time diversity technique with quantization error compensation in accordance with the invention.

Another illustrative embodiment of the invention provides a further improvement in SNR performance through the use of time diversity in conjunction with quantization error compensation. As in the time diversity technique illustrated in FIG. 1, this technique employs a sliding block structure with overlaps. However, a suitable feedback mechanism is introduced in order to apply the quantization noise from one block into the next successive block. This process is illustrated in FIG. 2. More specifically, for any signal sample $S_t(i)$, $$S_t(i) \to S_t(i) + n_t(i) = \bar{S}_{t1} \to S_t(i) - n_t(i) + n_{t+1}(i) = \bar{S}_{t2} \to \ldots$$

At the receiver, if all the packets are received, the sum of all $$\bar{S}_{tj} \Big|_{j=1}^{N}$$

is taken to obtain $$\bar{S}_t(i) = \bar{S}_{t1}(i) + \ldots \bar{S}_{tN}(i)$$
$$= N S_t(i) + n_N(i)$$

In this case, when all N packets are received, there is a coding and time diversity transmission gain in the amount of $20 \log_{10} N$, instead of $10 \log_{10} N$ as in the previous cases. However, every packet loss in this case introduces two extra noise components, i.e., the SNR is this case is $$\frac{N^2 <S^2>}{[2(N-N')+1] <n^2>}$$

which corresponds to a gain of $$20 \log_{10} N - 10 \log_{10}[2(N-N')+1].$$

For example, if there is a single packet loss, N−N'=1, and the SNR is determined in accordance with the above SNR equation as $$SNR = 10 \log_{10} \frac{N^2}{3}.$$

This represents a loss of about 4.7 dB from the original gain of 20 log N. When two packets are lost in a case in which N is greater than two, the SNR gain is reduced by 10 log 5=7 dB. More particularly, for N=3 with only one packet surviving, the SNR gain would be $20 \log_{10} 3-7=9.5-7=2.5$ dB, still a positive gain. For N=4 and N'=2, the SNR gain would be $20 \log_{10} 4-7=5$ dB. For N=4 and N'=1, the SNR gain would be $20 \log_{10} 4-10 \log_{10} 7=12-8.45=3.55$ dB. In general, $$\log_{10} N^2 > \log_{10}[2(N-N')+1] \text{ for } N>N'.$$

It should be noted that the number of packets N transmitted in the above-described time diversity technique can be made adaptive to network conditions. For example, if the packet loss rate is high, N can also be chosen to be large.

FIG. 3 shows a portion of a communication system transmitter 100 suitable for implementing the above-described time diversity techniques. The transmitter 100 includes N coding paths for generating N different packets for transmitting a given block of information. Each of the N paths has associated therewith a framing element 102-j, a coder 104-j, and a packetization element 106-j. The transmitter further includes a set of delay elements 108-1, 108-2, . . . 108-(N−1), a set of subtractors 110-1,110-2, . . . 110-(N−1), and a protocol interface 120. An input block of information to be transmitted is applied to input 101 of the transmitter 100. Each of the N coding paths generates a different encoded packet for the input block of information, and applies it to the protocol interface 120 for transmission over a packet-based transmission medium, e.g., an ATM or IP network, or other suitable transmission medium.

The delay elements 108-1, 108-2, . . . 108-(N−1) are used to introduce the above-described time diversity, and in the illustrative embodiment are configured to provide a delay on the order of 1/N of the block length between each of the packets.

Each of the subtractors 110-1, 110-2, . . . 110-(N−1) forms part of a feedback loop which introduces the quantization error from a given coder 104-j from one of the coding paths into the framing element 102-(j+1) of the next coding path. In the framing element 102-(j+1), the quantization noise associated with the encoding performed in the previous coding path is further subtracted from the incoming signal supplied from the corresponding delay element 108-1, 108-2, . . . or 108-(N−1). These feedback loops implement the quantization error compensation previously described in conjunction with FIG. 2.

In implementing the transmitter 100, coding errors may be made independent by, e.g., using different coders that are known to produce statistically independent coding or quantization errors. As another example, one can make use of the coding characteristics of the same coder, such as variation due to initialization, variation in prediction error due to variation in framing, use of different codebooks or quantization tables, and use of known, prior processing such as spectral rotation, dithering, and use of nonlinearity. It is also possible to use embedded coders or specially designed multi-stream coders.

As previously noted, the invention can be used in a wide variety of different communication system applications, and can be applied to the transmission of any type of information, including voice, data, audio, video, images and other types of information. These and numerous other alternative embodiments and implementations within the scope of the following claims will be apparent to those skilled in the art.

What is claimed is:

1. A method of processing information for transmission in a communication system, the method comprising the steps of:

generating multiple versions of a particular block of information to be transmitted;

introducing time shifts between the multiple versions; and transmitting the multiple versions as a plurality of packets;

wherein the time shift introduced between at least one pair of the multiple versions is determined at least in part as a function of a time duration of a particular one of the versions.

2. The method of claim 1 wherein a set of N packets are formed for the block of information to be transmitted, each of the N packets corresponding to one of N versions of the block of information, and wherein the time shift introduced between at least one pair of the N versions corresponds to approximately 1/N of the time duration of a particular one of the versions.

3. The method of claim 2 wherein a set of N encoders are used to generate the plurality of packets.

4. The method of claim 3 wherein a signal-to-noise ratio (SNR) of a composite reconstructed signal generated from the plurality of packets with the introduced time shift in a receiver of the system is approximately the same as an SNR that would be obtained using a set of N independent encoders to generate the plurality of packets without the introduced time shift.

5. The method of claim 4 wherein a gain in the SNR of the composite reconstructed signal attributable to the introduction of the time shift is $10 \log_{10} N'$, where $N'=1, \ldots N$ is the total number of the N packets actually received at the system receiver.

6. The method of claim 1 wherein the packets comprise asynchronous transfer mode (ATM) packets.

7. The method of claim 1 wherein the packets comprise Internet protocol (IP) packets.

8. The method of claim 1 wherein the block of information to be transmitted comprises at least one of voice, audio, data, image and video information.

9. A method of processing information for transmission in a communication system, the method comprising the steps of:

generating multiple versions of a particular block of information to be transmitted;

introducing time shifts between the multiple versions; and transmitting the multiple versions as a plurality of packets;

wherein each of at least a subset of the versions of the block of information to be transmitted is adjusted to include at least one quantization noise component from an encoder associated with another of the versions of the block of information to be transmitted, so as to implement quantization noise compensation.

10. The method of claim 9 wherein a gain in the SNR of the composite reconstructed signal attributable to the introduction of the time shift and the quantization error compensation is $$20 \log_{10} N - 10 \log_{10}[2(N-N')+1],$$

where $N'=1, \ldots N$ is the total number of the N packets actually received at the system receiver.

11. An apparatus comprising:

a communication system transmitter operative to generate multiple versions of a particular block of information to be transmitted, to introduce time shifts between the multiple versions, and to transmit the multiple versions as a plurality of packets;

wherein the time shift introduced between at least one pair of the multiple versions is determined at least in part as a function of a time duration of a particular one of the versions.

12. The apparatus of claim 11 wherein a set of N packets are formed for the block of information to be transmitted, each of the N packets corresponding to one of N versions of the block of information, and wherein the time shift introduced between at least one pair of the N versions corresponds to approximately 1/N of the time duration of a particular one of the versions.

13. The apparatus of claim 12 wherein a set of N encoders are used to generate the plurality of packets.

14. The apparatus of claim 13 wherein a signal-to-noise ratio (SNR) of a composite reconstructed signal generated from the plurality of packets with the introduced time shift in a receiver of the system is approximately the same as an SNR that would be obtained using a set of N independent encoders to generate the plurality of packets without the introduced time shift.

15. The apparatus of claim 14 wherein a gain in the SNR of the composite reconstructed signal attributable to the introduction of the time shift is $10 \log_{10} N'$, where $N'=1, \ldots N$ is the total number of the N packets actually received at the system receiver.

16. The apparatus of claim 11 wherein the packets comprise asynchronous transfer mode (ATM) packets.

17. The apparatus of claim 11 wherein the packets comprise Internet protocol (IP) packets.

18. The apparatus of claim 11 wherein the block of information to be transmitted comprises at least one of voice, audio, data, image and video information.

19. An apparatus comprising:
a communication system transmitter operative to generate multiple versions of a particular block of information to be transmitted, to introduce time shifts between the multiple versions, and to transmit the multiple versions as a plurality of packets;
wherein each of at least a subset of the versions of the block of information to be transmitted is adjusted to include at least one quantization noise component from an encoder associated with another of the versions of the block of information to be transmitted, so as to implement quantization noise compensation.

20. The apparatus of claim 19 wherein a gain in the SNR of the composite reconstructed signal attributable to the introduction of the time shift and the quantization error compensation is $$20 \log_{10} N - 10 \log_{10}[2(N-N')+1],$$

where $N'=1, \ldots N$ is the total number of the N packets actually received at the system receiver.

21. A communication system transmitter comprising:
a plurality of delay elements operative to introduce time shifts between multiple versions of a particular block of information to be transmitted;
a plurality of coding paths, each generating a corresponding packet from one of the multiple versions of the block of information; and
an interface for delivering the packets to a communication medium of the system;
wherein the time shift introduced between at least one pair of the multiple versions is determined at least in part as a function of a time duration of a particular one of the versions.

22. A method of processing information for transmission in a communication system, the method comprising the steps of:
generating multiple versions of a particular block of information to be transmitted, wherein each of the multiple versions is generated using a corresponding one of a set of multiple independent encoders; and
transmitting the multiple versions as a plurality of packets;
wherein a time shift is introduced between at least one pair of the multiple versions, the time shift being determined at least in part as a function of a time duration of a particular one of the versions.

23. An apparatus comprising:
a communication system transmitter operative to generate multiple versions of a particular block of information to be transmitted, wherein each of the multiple versions is generated using a corresponding one of a set of multiple independent encoders, and to transmit the multiple versions as a plurality of packets;
wherein a time shift is introduced between at least one pair of the multiple versions, the time shift being determined at least in part as a function of a time duration of a particular one of the versions.

24. A method of processing information for transmission in a communication system, the method comprising the steps of:
generating multiple versions of a particular block of information to be transmitted, wherein the number of multiple versions is adaptively determined at least in part based on a packet loss related condition of the system; and
transmitting the multiple versions as a plurality of packets;
wherein a time shift is introduced between at least one pair of the multiple versions, the time shift being determined at least in part as a function of a time duration of a particular one of the versions.

25. An apparatus comprising:
a communication system transmitter operative to generate multiple versions of a particular block of information to be transmitted, wherein the number of multiple versions is adaptively determined at least in part based on a packet loss related condition of the system, and to transmit the multiple versions as a plurality of packets;
wherein a time shift is introduced between at least one pair of the multiple versions, the time shift being determined at least in part as a function of a time duration of a particular one of the versions.

* * * * *